US009686226B1

(12) United States Patent
Gardner et al.

(10) Patent No.: US 9,686,226 B1
(45) Date of Patent: Jun. 20, 2017

(54) DOMAIN NAME SYSTEM (DNS) QUERY RESPONSE PROVIDING LOOP-BACK INTERNET PROTOCOL (IP) ADDRESS TO NON-ACTIVATED MOBILE COMMUNICATION DEVICE

(71) Applicant: Sprint Communications Company L.P., Overland Park, KS (US)

(72) Inventors: Jeffrey Gardner, Linn Valley, KS (US); Edward A. Mlodzik, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 408 days.

(21) Appl. No.: 14/279,193

(22) Filed: May 15, 2014

(51) Int. Cl.
*G06F 15/16* (2006.01)
*H04L 29/12* (2006.01)

(52) U.S. Cl.
CPC .................................. *H04L 61/15* (2013.01)

(58) Field of Classification Search
CPC .................. H04L 61/1511; H04L 43/0876
See application file for complete search history.

(56) References Cited

U.S. PATENT DOCUMENTS

| | | | |
|---|---|---|---|
| 9,325,735 B1* | 4/2016 | Xie | H04L 63/145 |
| 2004/0110484 A1* | 6/2004 | Koshino | H04W 88/14 455/403 |
| 2007/0067465 A1* | 3/2007 | Blinn | H04L 29/12066 709/229 |
| 2007/0233790 A1* | 10/2007 | Agarwal | G06Q 10/107 709/206 |
| 2008/0026740 A1* | 1/2008 | Netanel | G06Q 20/382 455/419 |
| 2010/0318681 A1* | 12/2010 | Shi | G06F 15/16 709/245 |
| 2012/0087279 A1* | 4/2012 | Rinne | H04L 12/2425 370/254 |
| 2013/0269019 A1* | 10/2013 | Garmark | G06F 9/54 726/9 |

* cited by examiner

*Primary Examiner* — Shean Tokuta (57) ABSTRACT

A domain name system (DNS) server. The domain name system server comprises a processor, a memory, and an application stored in the memory. When executed by the processor, the application receives an invalid domain name system address query and, in response to the invalid domain name system address query, returns a query response comprising a loop-back internet protocol address and a time to live value of less than about ten seconds.

16 Claims, 4 Drawing Sheets

DOMAIN NAME SYSTEM (DNS) QUERY RESPONSE PROVIDING LOOP-BACK INTERNET PROTOCOL (IP) ADDRESS TO NON-ACTIVATED MOBILE COMMUNICATION DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A domain name system (DNS) may be maintained to promote ease of computer systems and/or applications executing on computers translating domain names that are used by application level programs to internet protocol addresses that are used for routing, for example routing service requests. The domain name system may be open and accessible to any computer or device and may be referred to as a public domain name system.

Mobile communication devices may be inactive when they are first powered on. For example, initially the mobile communication devices may be incapable of engaging in voice communications or data communications of any but the most rudimentary kind. A possible exception may be that even inactive mobile communication devices may be able to initiate and carry on an emergency phone call, as mandated by US federal law. Mobile communication devices that are inactive may be granted restricted communication access to communicate with servers in a mobile communication service provider private network to conduct activation functions. Mobile communication service activation may proceed in a series of steps, each step incrementally building and/or enabling additional communication functionality. Some of the activation steps may proceed automatically under the control of scripts and/or applications executing on the mobile communication device and/or executing on servers in the mobile communication service provider private network.

SUMMARY

In an embodiment, a domain name system (DNS) server is disclosed. The domain name system server comprises a processor, a memory, and an application stored in the memory. When executed by the processor, the application receives an invalid domain name system address query and, in response to the invalid domain name system address query, returns a query response comprising a loop-back internet protocol address and a time to live value of less than about ten seconds.

In an embodiment, a method of performing a domain name system (DNS) internet protocol look-up is disclosed. The method comprises receiving an invalid domain name system address query and, in response to the invalid domain name system address query, returning a query response comprising a loop-back internet protocol address and a time to live value of less than about ten minutes.

A method of performing a domain name system (DNS) internet protocol look-up is disclosed. The method comprises receiving an invalid domain name address query on a slot 0 private network from a mobile communication device that is not provisioned for mobile communication service; and, in response to the invalid domain name system address query, returning a query response comprising a loop-back internet protocol address and a time to live value of less than about ten seconds.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

When a mobile communication device, for example a mobile phone, is powered on for the first time it may complete an activation process. An initial stage of the activation process may entail the device establishing a wireless link with a base transceiver station (BTS), an enhanced node B (eNB), or cell tower and communicating via the base transceiver station or eNB with a private provisioning network of the mobile communication service provider. During the initial stage of activation, messages may be exchanged between the device and a provisioning server over the private provisioning network. During the initial stage of the activation process, the device may be provisioned with a reference to a private domain name system (DNS) server that communicates on the private provisioning network, and the device or a hands-free activation (HFA) application on the device may request one or more internet protocol (IP) addresses of provisioning servers from the private DNS server.

The device may send a message requesting provisioning data to one or more of the provisioning servers using the IP address received from the private DNS server via the private provisioning network. The private provisioning network, a provisioning server in the private provisioning network, or a proxy layer provided by the private provisioning network may proxy the request message to the addressed provisioning server—forwarding the request message to the addressed provisioning server over a public network and forwarding the response message received from the addressed provisioning server to the device. After the initial stage of activation is completed, the mobile communication device may be provisioned with credentials for accessing the normal radio access network (RAN) of the mobile communication service provider and provisioned with a reference to a well-known or public DNS server. At this point the mobile communication device may complete further activation steps via the normal radio access network. Further activation may involve downloading graphical content and/or video content associated with branding and/or ornamentation of the device.

The device may be pre-loaded with applications that are configured to reach out to an application server, for example by sending a query containing a domain name in a universal datagram protocol (UDP) message to a DNS server and then using the returned IP address to request content from an application server to support the pre-loaded application. These pre-loaded applications may begin executing during the initial stage of device activation and may send the DNS query to the private DNS server on the private provisioning network. The load of many devices undergoing activation and sending DNS queries from pre-loaded applications to the private DNS server can present an undesirable load on the private DNS server.

Additionally, when the private DNS server returns a response with an IP address, the same pre-loaded applications may then respond by sending one or more transport control protocol (TCP) messages requesting content from the IP address. It is understood that TCP messages, other things being equal, present a greater network load than UDP messages. Thus, the pre-loaded applications requesting content during initial activation can present an undesirable load on the private provisioning network. Mobile communication service providers may experience growth of private provisioning network traffic, possibly driven by an increasing popularity of smart phones with pre-loaded applications. Such growth may entail increased capital spending to build up the private provisioning network to increase the number of servers to manage the additional load on private DNS servers and the private provisioning network. This increased capital investment may be avoided by applying the teachings of the present disclosure.

The present disclosure teaches configuring the private DNS servers to return a normal IP address for DNS look-up queries specifying domain names that are white listed and to return an IP loop-back address for DNS look-up queries specifying any other domain names (e.g., other domain names that are not white listed). The white listed domain names may include domain names of provisioning servers that provide provisioning information used by the mobile communication device to complete its initial activation process. As is known to one skilled in the art, an IP loop-back address is an address that is processed as a location within the device itself. Hence, when the incompletely activated mobile communication device receives an IP loop-back address in response to a DNS query from a pre-loaded application, and the pre-loaded application then attempts to send a content request message to that IP loop-back address, the mobile communication device looks within itself for this address. This prevents the pre-loaded application from burdening the private provisioning network with content requests, which would typically be the TCP messages which present an inherently heavier network load than the simple UDP message of a DNS query message. In an embodiment, the IP loop-back address may be any IP version 4 address with the value 127 in the most significant byte of the address: 127.x.x.x, where 'x' represents any valid value 0 to 255. In an embodiment, the IP loop-back address may be 127.0.0.1. While the present disclosure describes a system and method based on IP version 4 (IPv4) addresses, it is understood that the disclosure contemplates adapting its teachings to the IP version 6 (IPv6) address format, substituting IPv6 loop-back address formats for the 127.x.x.x loop-back addresses of IPv4.

In an embodiment, the DNS query response containing the IP loop-back address may set a time to live value that is a relatively short value, for example a time to live value of less than a minute or a time value of less than 10 seconds. Setting a relatively short time to live value promotes the pre-loaded application looking up the IP address of the application support server again relatively quickly so it does not remain incomplete or unconfigured. By the time the time to live of the IP address expires, however, the mobile communication device may have completed the initial stage of its activation and may have been configured with a reference or IP address of a well-known DNS server, and hence the DNS queries and subsequent content accesses of the pre-loaded application are no longer a burden on the private provisioning network. The DNS query response for white listed domain names may set a time to live of a longer time duration, for example a time to live of at least 10 hours, at least 12 hours, at least 24 hours, or some other time to live value.

Figure 1:
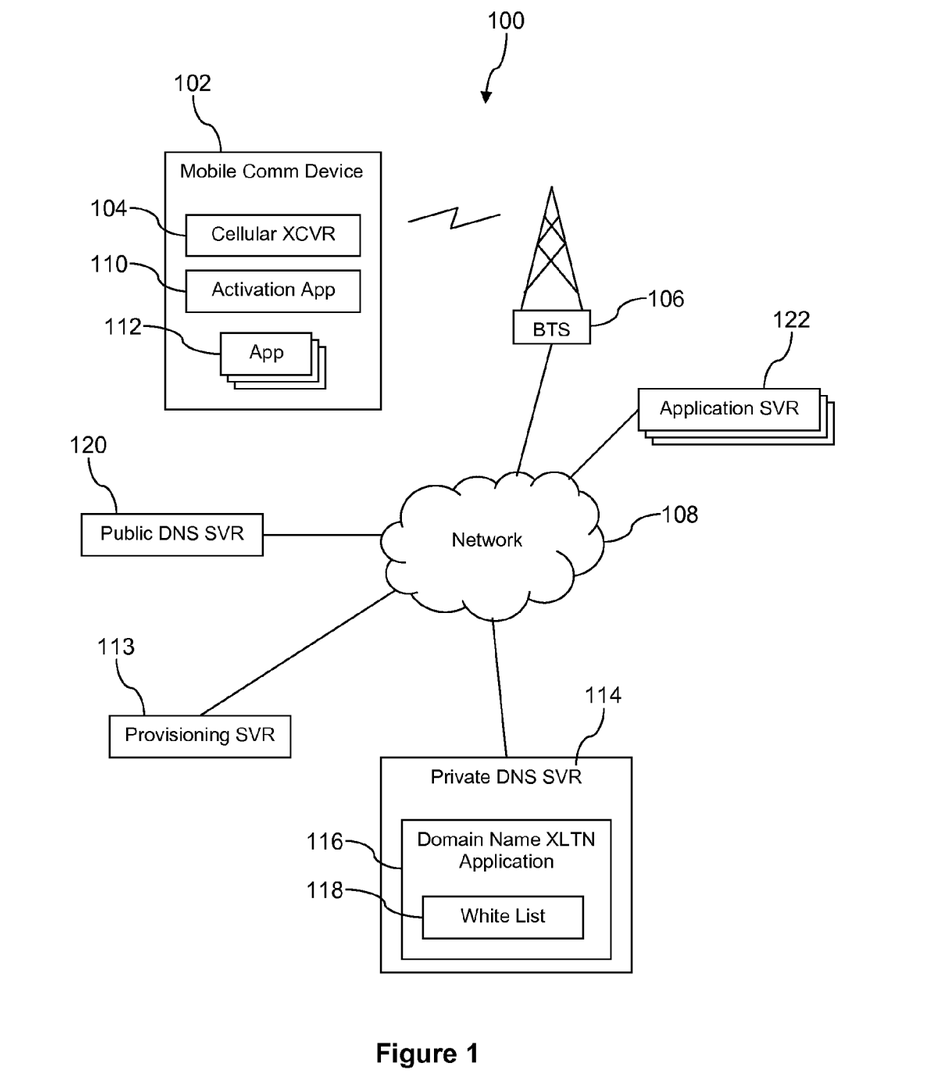
FIG. 1 is a block diagram of a communication system according to an embodiment of the disclosure.

Turning now to FIG. 1, a system 100 is described. In an embodiment, the system 100 comprises a mobile communication device 102, a base transceiver station 106, a network 108, a provisioning server 113, a private domain name system (DNS) server 114, a public DNS server 120, and a plurality of application servers 122. The mobile communication device 102 comprises a cellular radio transceiver 104 that is used to establish a wireless communication link with the base transceiver station 106. The base transceiver station 106 may communicatively couple the device 102 with the network 106. The mobile communication device 102 further comprises an activation application 110 and a plurality of applications 112. In some contexts the applications 112 may be referred to as pre-loaded applications and/or original equipment manufacturer (OEM) loaded applications. The servers 113, 114, 120, 122 may be computer systems. Computer systems are described further hereinafter.

The mobile communication device 102 may be a mobile phone, a smart phone, a media player, or a personal digital assistant. In an embodiment, the mobile communication device 102 may be a laptop computer, a notebook computer, or a tablet computer. In an embodiment, the base transceiver station 106 may be an enhanced node B (eNB), a cell tower, or other radio access network (RAN) edge node. In an embodiment, the private DNS server 114 comprises a domain name to IP address translation application 116 that may be referred to in some contexts as a domain name translation application or more simply as a translation application. In an embodiment, the translation application 116 comprises a white list 118.

When the mobile communication device 102 is powered on for the first time (e.g., after the device 102 is purchased, unpacked, has the battery installed, and is turned on for the first time), the device 102 may complete an activation process. In an embodiment, the device 102 may also need to complete the activation process after a full device reset. Before activation, the device 102 may not be provisioned for mobile communication service and may be unable to complete voice calls or data calls, with the exception of emergency calls such as E911 calls. The activation process may involve many steps and may extend over a period tens of minutes or over hours. The activation process may be thought of as taking place in stages or thought of as building up layers of functionality. For example, an initial stage of activation may entail provisioning a mobile communication network as well as the mobile communication device 102 to promote basic voice and data connectivity of the device 102 to the network 108 via the base transceiver station 106. For example, a home location register (HLR) and a visitor location register (VLR) may be initialized with information about the subscriber and the device 102. A subscription account may be associated with the mobile communication device 102, for example to a phone number and a mobile equipment identity (MEID) of the device 102. The mobile communication device 102 may be provided with radio access network credentials for obtaining a radio link from the base transceiver station 106. During the initial stage of activation the mobile communication device 102 may be provided with an address of the public DNS server 120.

After the mobile communication device 102 is first powered on and before it has completed the initial stage of activation, the device 102 may be restricted to communicating over a private network of the mobile communication service provider. The activation application 110 is configured to communicate with the provisioning server 113 via the private network. In some contexts, this private network may be referred to as "slot 0" or "the slot 0 network." Said in other words, the slot 0 network may be a private network that provides restricted communications access to the mobile communication device 102 to promote initialization and/or activation of the mobile communication device 102. For example, the slot 0 network may prevent applications installed on the mobile communication device 102 from establishing communication with application servers. When activated, the mobile communication device 102 may be provisioned to communicate on other networks that may be referred to as "slot 1" through "slot 7" networks. It is understood that each of the "slot 0" through "slot 7" networks may be provided using the same hardware network resources and the distinction between networks may be defined by policies and/or access privileges enforced by network nodes.

When the mobile communication device 102 is first powered on, the applications 112 may be executed in the background or stored in memory in a ready-idle state. An application 112, when transitioning to such a stored in memory ready-idle state, may determine that it is not fully configured and may be programmed to reach out to one of the application servers 122 accessible via the network 108 to complete its configuration. The application 112 may send a domain name translation request message to the private DNS server 114 to obtain the IP address of the application server 122 that it is associated with. The translation application 116 checks the domain name contained in the translation request message to determine if it is contained on the white list 118. If the domain name is not contained on the white list 118, the translation application 116 returns a domain name translation response message containing a loop-back IP address and containing a time to live value that is relatively short as compared to that assigned to domain names which are listed on the white list 118. In an embodiment, the time to live value may be less than about 3 seconds, less than about 6 seconds, less than about 12 seconds, less than about 1 minute, or less than about 10 minutes. In a preferred embodiment, the time to live value may be about 5 seconds. In some contexts, a domain name translation request sent to the translation application 116 executing on the private DNS server 114 that identifies a domain name not listed on the white list 118 may be referred to as an invalid domain name system (DNS) address query.

As is known to those skilled in the art, an IP loop-back address informs the IP stack executing on a processor (e.g., a mobile communication device processor or a host computer processor) to route IP messages directed to the loop-back address to a location within that same processor or host. An IP version 4 loop-back address may comprise an address in the range 127.x.x.x, where the 'x' may be replaced by any number in the range 0 to 255. In an embodiment, the loop-back address that is returned to the application 112 is 127.0.0.1. It is understood that any IP loop-back address may be used, for example an IP loop-back address that is consistent with IP version 6 address conventions may be used.

The application 112 may respond to the domain name translation response message by sending a content request to the IP loop-back address contained in the response message, for example a content request embedded in a transfer control protocol (TCP) message. This content request, however, remains within the device 102 and does not get sent to the private network (e.g., to the slot 0 network) and therefore does not congest or overload the private network. Because of the relatively short time to live value provided with the domain name translation response, when the application 112 attempts to use the domain name later—for example at a time 5 seconds later—the device 102 may be provisioned to communicate on the normal network (e.g., slot 1 through slot 7 network), may be provisioned with the address of the public DNS server 120, and the device 102 sends a domain name translation request to the public DNS server 120. The public DNS server 120 may then return the actual address of the application server 122 to the application 112. The application 112 may then send content requests to the application server 122 based on the actual address returned by the public DNS server 120.

Sending the IP loop-back address by the translation application 116 in the domain name translation response message prevents the private network from being overloaded with content requests from applications 112 during the initial stage of activation. At the same time, this procedure does not degrade the performance of the applications 112, because the applications 112 may perform another domain name look-up for their application server 122 after a short period of time as provided by the time to live value in the domain name translation response message. If the mobile communication device 102 does not complete the initial stage of activation within the time associated with the time to live value, the application 112 may again send a domain name translation request to the private DNS server 114 and again receive a reply with an IP loop-back address. It is not anticipated that this eventuality (e.g., repeated DNS queries from an application spaced about 5 seconds apart or spaced some other period of time apart related to the time to live value) would present a significant burden on the private network for these universal datagram protocol (UDP) translation request messages. At the same time, in combination with the present disclosure, one skilled in the art will be able to adapt the time to live value returned by the private DNS server 114 for such invalid DNS queries to reduce such repeat domain name translation requests if they are deemed burdensome to the private network.

If, however, the translation application 116 determines that the domain name contained in the domain name translation request message is contained on the white list 118, the translation application 116 looks up the actual IP address associated with the subject domain name (e.g., recalls the IP address from a cached translation or sends a domain name translation request message to a public DNS server, for example to the public DNS server 120), and returns the actual IP address to the application 112 or to another application on the device 102 in a domain name translation response message where the actual IP address to the application 112 is not an IP loop-back address. In some cases the domain name translation request message may come from not one of the applications 112 but instead from other applications or programs stored on the device 102. The domain names that are contained on the white list 118 may be associated with provisioning servers and/or activation servers that promote building the initial layer of functionality on the device 102 and/or completing the initial stage of activation of the device 102. In some contexts, a domain name translation request sent to the translation application 116 executing on the private DNS server 114 that identifies a domain name listed on the white list 118 may be referred to as a valid domain name system (DNS) address query.

The translation application 116 may provide a relatively long time to live value to the domain name translation response message associated with a white listed domain name. For example, the time to live value may be at least 4 hours, at least 10 hours, at least 12 hours, at least 24 hours, or some other period of time. Because the IP address returned by for a look-up request on a white listed domain name is the actual IP address associated with the subject domain name, providing a relatively long time duration in the time to live value may provide good serviceability to the requesting application 112 or other application.

Figure 2A:
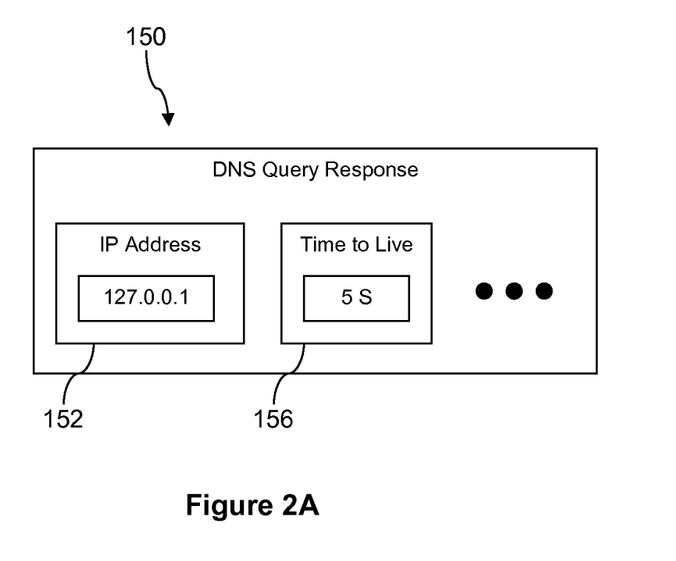
FIG. 2A is an illustration of a domain name system (DNS) query response according to an embodiment of the disclosure.
Figure 2B:
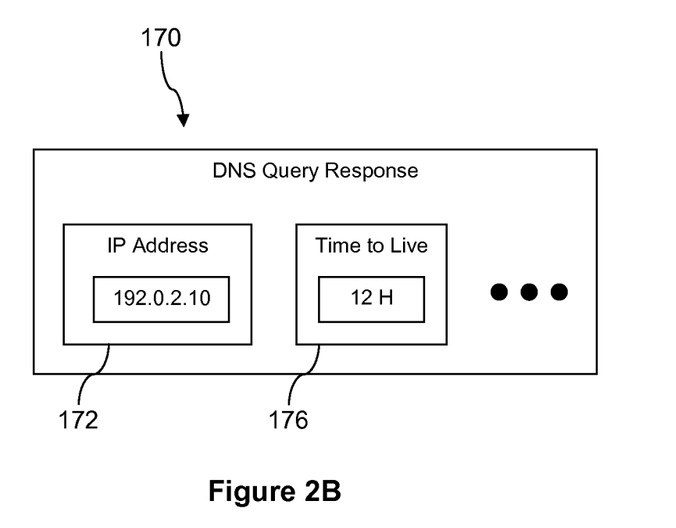
FIG. 2B is an illustration of another domain name system query response according to an embodiment of the disclosure.

Turning now to FIG. 2A and to FIG. 2B, example domain name system query responses are described. A first domain name system query response 150 may be returned in response to an invalid domain name system address query, for example a query for an IP address of a domain name that is not contained on the white list 118. The first DNS query response 150 comprises an Internet Protocol (IP) address 152 that comprises a loop-back address, for example comprises the loop-back address 127.0.0.1. It is understood that the DNS query response 150 IP address 152 may comprise any loop-back address, for example any IP address of the form 127.x.x.x, where each 'x' may independently take any value in the range 0 to 255 (e.g., the first 'x' may be a first value in the range 0-255 while the second 'x' may be a second different value in the range 0-255 [the first 'x' may be 10 and the second 'x' may be 111]). While IPv4 addresses are used as examples, it is understood that corresponding IPv6 loop-back addresses may be used in an IPv6 addressing network. The first DNS query response 150 further comprises a time to live value 156 that comprises a relatively short time, for example a time to live value of 5 seconds.

By contrast, a second DNS query response 170 comprises an IP address 172 having an address that is NOT a loop-back address, for example 192.0.2.10. (Note that the example IP address value in FIG. 2B is consistent with the Internet Engineering Task Force (IETF) Request for Comments (RFC 5737) that addresses the subject of IPv4 addresses for use in examples. It is hoped that this choice reduces the likelihood of conflicts and confusion arising from the use of addresses assigned for some other purpose, for example an IP address that may be assigned to a functioning host computer.) In an embodiment, an IP address corresponding to an actual provisioning server 113 may be provided in the IP address 172. The second DNS query response further comprises a time to live value 176 that comprises a relatively long value, for example a time to live value of 12 hours.

Figure 3:
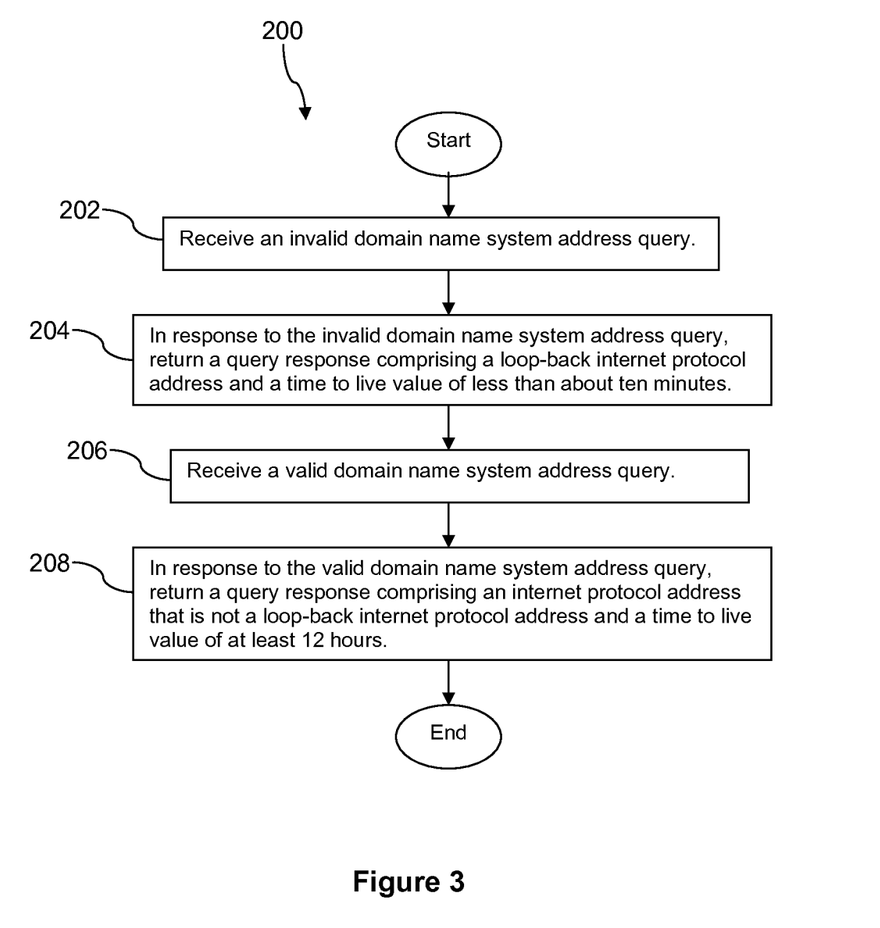
FIG. 3 is a flow chart of a method according to an embodiment of the disclosure.

Turning now to FIG. 3, a method 200 is described. At block 202, an invalid domain name system address query is received. As discussed more fully above, as used herein an 'invalid domain name system address query' is a DNS address query that contains a domain name that is NOT contained on the white list 118. This definition is restricted to the context of a DNS address query sent to the private DNS server 114. At block 204, a query response comprising a loop-back internet protocol address and a time to live value of less than about 10 minutes is returned in response to the invalid DNS address query. For example, a query response comprising an IP address of 127.x.x.x is returned. For example, a query response comprising an IP address of 127.0.0.1 is returned. For example a query response comprising a time to live value of about 5 seconds is returned. In another embodiment, time to live values of less than about 10 minutes may be returned in response to the invalid DNS address query, for example a time to live value of less than about 5 minutes, a time to live value of less than about 1 minute, a time to live value of less than about 30 seconds, a time to live value of less than about 10 seconds, or a time to live value of about 5 seconds.

At block 206, a valid domain name system address query is received. As discussed more fully above, as used herein a 'valid domain name system address query' is a DNS address query that contains a domain name that IS contained on the white list 118. This definition is restricted to the context of a DNS address query sent to the private DNS server 114. At block 208, a query response comprising an internet protocol address that is NOT a loop-back address and a time to live value of at least 12 hours is returned in response to the valid DNS address query. It is understood that different time to live value may be returned in the query response.

Figure 4:
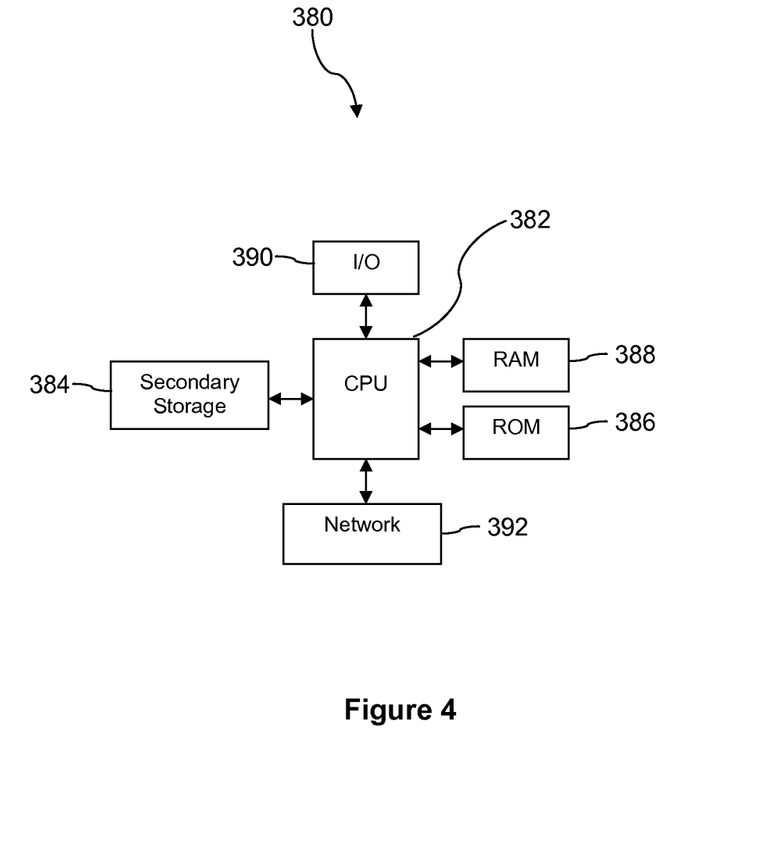
FIG. 4 is an illustration of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embedded in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A domain name system server communicatively coupled to a provisioning server, comprising:
    a processor;
    a memory comprising a white list of domain names for domains that provide information used to complete an initial activation process of a mobile device; and
    an application stored in the memory that, when executed by the processor during the initial activation process of the mobile device before the mobile device is provisioned:
        receives, from the mobile device, a domain name system address query;
        in response to the domain name system address query being for a domain name unrelated to the initial activation process of the mobile device and not on the white list, returns, to the mobile device, a query response comprising a loop-back internet protocol address and a time to live value of less than one minute; and
        in response to the domain name system address query being for a domain name related to the initial activation process of the mobile device and on the white list, looking up an internet protocol address associated with the domain name related to the initial activation process of the mobile device.

2. The server of claim 1, wherein the loop-back internet protocol address is consistent with a 127.x.x.x internet protocol address.

3. The server of claim 2, wherein the loop-back internet protocol address is 127.0.0.1.

4. The server of claim 1, wherein the time to live value returned in the query response is less than ten seconds.

5. The server of claim 1, wherein a domain name system address query for a domain name on the white list is a valid domain name system query.

6. The server of claim 1, where in response to the domain name system address query being for the domain name related to the initial activation process of the mobile device and on the white list, the application when executed:
    returns a query response comprising a time to live value of at least 12 hours and the internet protocol address associated with the domain name related to the initial activation process of the mobile device, wherein the internet protocol address associated with the domain name related to the initial activation process of the mobile device is not a loop-back internet protocol address.

7. A method of performing a domain name system internet protocol look-up on a domain name system server communicatively coupled to a provisioning server during an initial activation process of a mobile device, comprising:
    receiving, by a domain name system server from a mobile device before the mobile device is provisioned, a domain name system address query;
    in response to the domain name system address query being for a domain name that is not related to the initial activation process of the mobile device and not included in a white list of domain names for domains that provide information used to complete the initial activation process of the mobile device, returning, by the domain name system server to the mobile device, a query response comprising a loop-back internet protocol address and a time to live value of less than ten minutes; and
    in response to the domain name system address query being for a domain name related to the initial activation process of the mobile device and on the white list, looking up an internet protocol address associated with the domain name related to the initial activation process of the mobile device.

8. The method of claim 7, wherein returning the query response comprising the loop-back internet protocol address reduces repeat domain name system address queries unrelated to the initial activation process of the mobile device from the mobile device when the mobile device has not been fully activated.

9. The method of claim 7, wherein returning the query response comprising the loop-back internet protocol address reduces attempts by the mobile device to establish transport control protocol communication sessions unrelated to the initial activation process of the mobile device when the mobile device has not been fully activated.

10. The method of claim 7, wherein the domain name system server is on a private network.

11. The method of claim 7, wherein the domain name system server is on a private network of a mobile communication service provider.

12. The method of claim 7, further comprising:
receiving a domain name system address query for an open mobile alliance device management server; and
in response to the domain name system address query for the open mobile alliance device management server, returning a query response comprising an internet protocol address for the open mobile alliance device management server that is not a loop-back internet protocol address.

13. The method of claim 12, wherein the query response to the domain name system address query for the open mobile alliance device management server further comprises a time to live value of at least 12 hours.

14. The method of claim 7, further comprising:
returning a query response comprising a time to live value of at least 12 hours and the internet protocol address associated with the domain name related to the initial activation process of the mobile device and on the white list, where the internet protocol address associated with the domain name related to the initial activation process of the mobile device is not a loop-back internet protocol address.

15. A method of performing a domain name system internet protocol look-up on a domain name system server communicatively coupled to a provisioning server during an initial activation process of a mobile device, comprising:
receiving, by a domain name system server from a mobile device before the mobile device is provisioned, a domain name address query on a slot 0 private network from the mobile device, wherein the mobile device is not provisioned for mobile communication service;
in response to the domain name system address query being for a domain name that is not related to the initial activation process of the mobile device and not included in a white list of domain names for domains that provide information used to complete the initial activation process of the mobile device, returning, by the domain name system server to the mobile device, a query response comprising a loop-back internet protocol address and a time to live value of less than ten seconds; and
in response to the domain name system address query being for a domain name related to the initial activation process of the mobile device and on the white list, returning, by the domain name system server to the mobile device, a query response comprising an internet protocol address associated with the domain name related to the initial activation process of the mobile device.

16. The method of claim 15, wherein the white list comprises domain names associated with web servers that promote initial activation of the mobile device.

* * * * *